(12) United States Patent
DuMars et al.

(10) Patent No.: US 6,190,479 B1
(45) Date of Patent: Feb. 20, 2001

(54) CURED TREAD PROCESSING FOR TIRE RETREADING

(76) Inventors: David Bruce DuMars; Anita DuMars, both of 205 Yoakum Pkwy, Apt. 1826, Alexander, VA (US) 22304

( * ) Notice: Under 35 U.S.C. 154(b), the term of this patent shall be extended for 0 days.

(21) Appl. No.: 09/328,660

(22) Filed: Jun. 9, 1999

Related U.S. Application Data

(60) Provisional application No. 60/089,949, filed on Jun. 19, 1998.

(51) Int. Cl.[7] .................................................. B29C 35/02
(52) U.S. Cl. .................. 156/129; 156/394.1; 264/210.2; 264/280; 264/284; 425/373; 425/385
(58) Field of Search ......................... 156/96, 909, 394.1, 156/129; 425/373, 385, 34.1; 264/280, 284, 177.19, 210.2; 152/209.6

(56) References Cited

U.S. PATENT DOCUMENTS

| | | | | |
|---|---|---|---|---|
| 3,829,271 | * | 8/1974 | Taylor | 425/385 |
| 4,361,456 | * | 11/1982 | Reschke | 425/373 |
| 5,104,600 | * | 4/1992 | Remond | 264/284 |

* cited by examiner

Primary Examiner—Geoffrey L. Knable

(57) ABSTRACT

A cured tread making apparatus and method including a tread extruder from which a hot rubber compound continuously exits, a continuous rotational curing device comprising a heated rotatable drum and a cooperating moving tension belt adapted to provide continuous curing pressure against the rotating drum, and cast segments, incorporating a particular tread design, attached to the exterior circumferential surface area of the heated drum.

11 Claims, 1 Drawing Sheet

EQUIPMENT FOR PRODUCING CURED TREADS FOR TIRE RETREADING

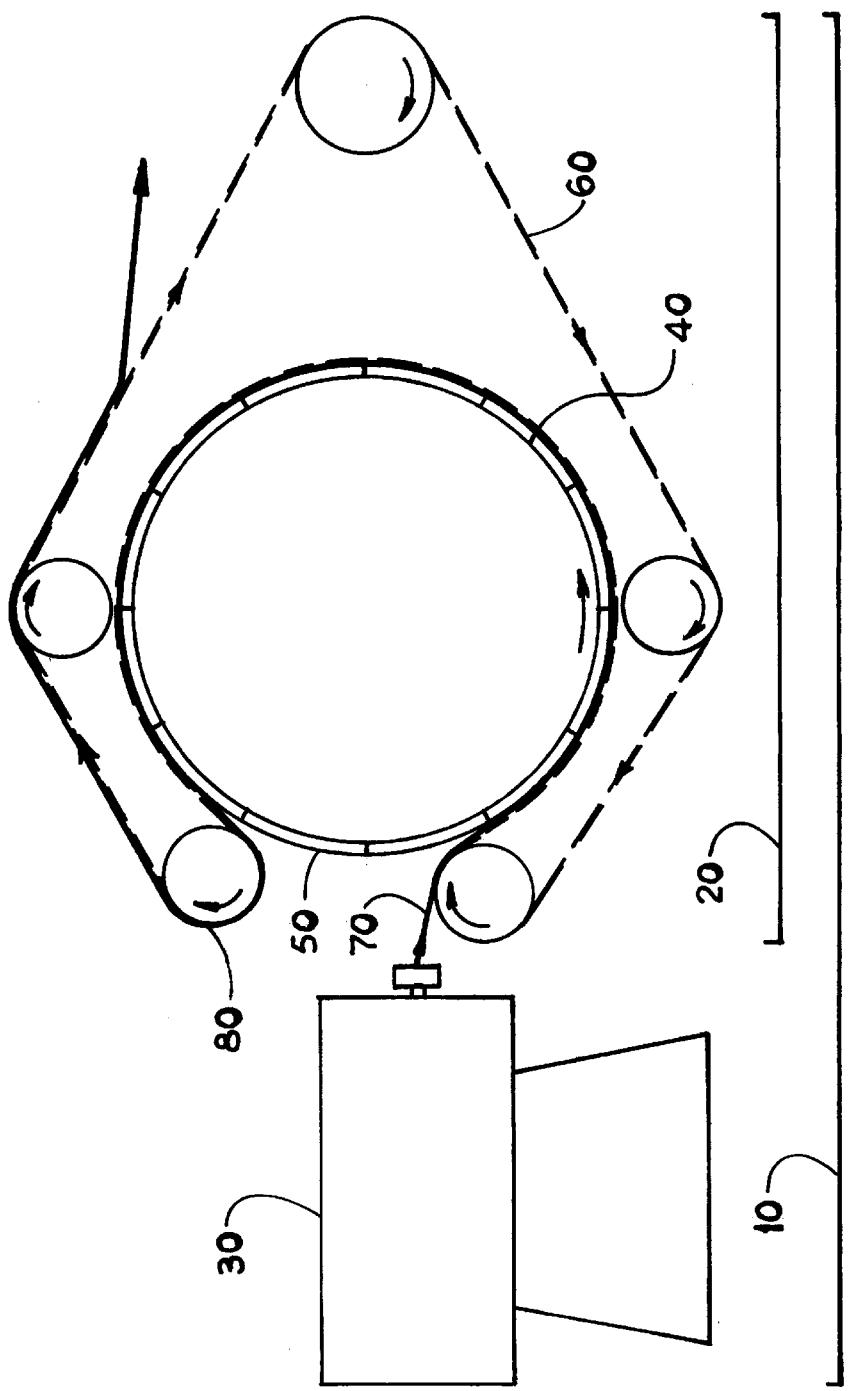

CURED TREAD PROCESSING FOR TIRE RETREADING

This application claims the benefit of U.S. Provisional Application No. 60/089,949, filed Jun. 19, 1998.

BACKGROUND OF THE INVENTION

1. Field of the Invention

The present invention relates generally to tire retread equipment, and, more particularly, to a cured tire retread extrusion device and method.

2. Description of the Related Art

With limited landfill space and consumer concerns regarding environmental pollution, tire manufacturers have found it necessary to engage in recycling of used tires. A wide variety of procedures and different types of equipment are available for use in retreading or recapping tires. Usually, the existing tread material is removed from the tire carcass by buffing. Then various procedures are used to apply one or more layers of uncured rubber or retreading material with appropriate bonding agents.

Heavy duty closing devices are often used to install molds which form new tread in retreading material on a prepared tire casing. Tire distortion sometimes occurs as a result.

As is commonly known in the tire retreading industry, another method of retreading tires involves the use of cured treads. The use of cured treads to retread individual tires, however, is a time consuming procedure. What is needed is a method to continuously produce cured treads that can be used to retread tires, thus saving time and money for the tire retread company, and ultimately, the consumer.

A search of the prior art did not disclose any patents that read directly on the claims of the instant invention; however, the following references were considered related:

U.S. Pat. No. 5,554,241, issued in the name of King et al.;
U.S. Pat. No. 5,342,462, issued in the name of King et al.;
U.S. Pat. No. 2,745,137, issued in the name of Glynn;
U.S. Pat. No. 3,779,831, issued in the name of Reppel;
U.S. Pat. No. 4,022,554, issued in the name of Macmillan;
U.S. Pat. No. 4,076,473, issued in the name of Macmillan;
U.S. Pat. No. 5,275,218, issued in the name of Nakayama et al.;
U.S. Pat. No. 5,603,366, issued in the name of Nakayama et al.;
U.S. Pat. No. 4,203,793, issued in the name of Brodie et al.;
U.S. Pat. No. 4,434,018, issued in the name of Brewer;
U.S. Pat. No. 4,579,619, issued in the name of Symmes et al.; and
U.S. Pat. No. 5,007,978, issued in the name of Presti.

While several features exhibited within these references are incorporated into this invention, alone and in combination with other elements, the present invention is sufficiently different so as to make it distinguishable over the prior art.

SUMMARY OF THE INVENTION

The present invention is a tread extrusion device and method, used in conjunction with an otherwise conventional Rotocure device, in which the extrusion process and molding process are combined into one continuous operation, thus reducing handling of the material, increasing energy efficiency, and reducing man hours required for production. In the present invention, cured treads are continuously produced for use on retread tires. Thus, the process from tread extrusion to final stocking for tire retreading is one continuous operation. As such, storage of the tread between operations is eliminated, with the hot extruded tread placed directly into the Rotocure, with a resulting reduction in the energy required for vulcanization of the rubber. The reduced handling and storage results in a worthwhile reduction in man hours required for tread production.

The present invention consists of an extruder from which the heated rubber compound continuously exits. Removable cast segments, incorporating a particular tread design, are removably attached to the steam heated Rotocure drum. Thus, the tread design is incorporated into the extruded tread as it passes through the rotocure.

It is an object of the present invention to provide a device and method that reduces energy consumption, utilizing less heat, creates less waste and requires fewer man hours to produce cured treads for retread tires.

DESCRIPTIVE KEY 10 a cured tread processing equipment
20 Rotocure
30 tread extruder
40 drum (steam heated)
50 cast segments with tread design to outside
60 Rotocure tension belt
70 extruded tread (entering Rotocure)
80 cured tread ((leaving Rotocure)

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 right side perspective view of the present invention and method in use.

DESCRIPTION OF THE PREFERRED EMBODIMENTS

The best mode for carrying out the invention is presented in terms of its preferred embodiment, herein depicted within the FIG. 1.

1. Detailed Description of the Figures

Referring now to FIG. 1, a cured tire retread extrusion device and method 10 is disclosed, used in conjunction with a continuous rotational curing or Rotocure device 20, to continuously produce cured treads used to retread tires in which the extrusion process and molding process are combined into one continuous operation. Thus, the process from tread extrusion to final stocking for tire retreading is one continuous operation, and storage of the tread 80 between operations is eliminated, with the hot extruded tread 70 placed directly into the Rotocure 20. Since the extruded tread 70 is hot, less energy is required to vulcanize the rubber, with a resulting reduction in the energy used. The reduced handling and storage also results in a worthwhile reduction in man hours required for tread production.

The present invention consists of a tread extruder 30 from which the hot extruded tread 70 continuously exits. Cast segments 50, incorporating a particular tread design are attached to the exterior circumferential surface area of the steam heated Rotocure 20 drum 40. Thus, the tread design is incorporated into the extruded tread 70 as it passes through the Rotocure 20. The cast segment 50 is removable, and as such, a plurality of cast segments 50 incorporating a variety of tread designs can be used with the present invention. The extruded tread material 70 is continuously fed from the tread extruder 30 to the cast segments 50 located on the Rotocure 20, in one continuous operation with curing pressure provided by the tension belt 60.

It is envisioned that other styles and configurations of components of the present invention can be easily incorporated into the teachings of the present invention, and only one particular configuration shall be shown and described for purposes of clarity and disclosure and not by way of limitation of scope.

2. Operation of the Preferred Embodiment

To use the present invention, the operator attaches a cast segment 50 incorporating a particular desired tread design to the exterior circumferential surface area of the Rotocure 20 drum 40. The tread extruder 30 is then activated. The extruded tread 70 passes from the tread extruder 30 to the cast segment 50 on the Rotocure 20. Once the material exits the Rotocure 20, it is then processed to a cushion application station, where it will be cut to length and stored for eventual tire retreading.

The foregoing description is included to illustrate the operation of the preferred embodiment and is not meant to limit the scope of the invention. The scope of the invention is to be limited only by the following claims.

What is claimed is:

1. A cured tread making apparatus comprising:

a tread extruder from which a hot rubber compound continuously exits;

a continuous rotational curing device comprising a heated rotatable drum and a cooperating moving tension belt adapted to provide continuous curing pressure against the rotating drum; and segments, incorporating a particular tread design, attached to the exterior circumferential surface area of the heated drum.

2. The cured tread making apparatus described in claim 1, wherein the segments are cast and are removable, and as such, a plurality of cast segments incorporating a variety of tread patterns can be used.

3. The cured tread making apparatus described in claim 1, wherein the tread extruder is adapted to continuously feed the rubber compound to the segments located on the drum, in one continuous operation, with the tread design incorporated into the extruded tread as it passes through the continuous rotational curing device.

4. The cured tread making apparatus described in claim 3, wherein the extruded tread is still hot when fed into the continuous rotational curing device.

5. The cured tread making apparatus described in claim 1, wherein the apparatus is configured so that handling of the extruded tread between extrusion and tread curing is eliminated.

6. A method of making a cured tread, comprising the steps of:

providing a tread extruder from which a hot rubber compound continuously exits;

providing a continuous rotational curing device comprising a heated rotatable drum and a cooperating moving tension belt adapted to provide continuous curing pressure against the rotating drum;

attaching segments incorporating a particular desired tread design to the exterior circumferential surface area of the drum;

activating the tread extruder to extrude a hot rubber compound;

continuously feeding the rubber compound to the segments located on the drum with the tread design incorporated into the extruded tread as it passes through the continuous rotational curing device.

7. The method of making a cured tread as described in claim 6, wherein the segments are cast and are removable, and as such, a plurality of cast segments incorporating a variety of tread patterns can be used.

8. The method of making a cured tread as described in claim 6, wherein the rubber compound is continuously fed from the tread extruder to the segments located on the drum, in one continuous operation, with the tread design incorporated into the extruded tread as it passes through the continuous rotational curing device.

9. The method of making a cured tread as described in claim 8, wherein the extruded tread is still hot when fed into the continuous rotational curing device.

10. The method of making a cured tread as described in claim 6, wherein there is no handling of the extruded tread between extrusion and tread curing.

11. The method of making a cured tread as described in claim 6, wherein once the material exits the continuous rotational curing device, it is processed at a cushion application station, where it will be cut to length and stored for later tire retreading.

* * * * *